Oct. 18, 1932.　　　O. U. ZERK　　　1,883,278

LUBRICATING COUPLER

Filed Oct. 21, 1929

Inventor
Oscar U. Zerk
By Slough + Canfield
Attys.

Patented Oct. 18, 1932

1,883,278

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATING COUPLER

Application filed October 21, 1929. Serial No. 401,277.

My invention relates to lubricating couplers, and more particularly relates to lubricating appliances of the class adapted for the communication of lubricant under pressure from a lubricant gun, or other source of lubricant under pressure to the bearings of mechanisms, such as the chassis bearings of automotive vehicles, the bearings of industrial machines, and the like.

In the lubrication of such bearings two general types of apparatus are commonly used: first, apparatus of the interlocking type wherein a separable coupling is employed for the purpose of temporarily relatively rigidly interlocking a nozzle of the lubricant dispensing apparatus, such as a lubricating gun, with a lubricant receiving nipple which is installed on an element of the bearing to be lubricated; second, apparatus of the contact type, wherein the nozzle and nipple are not substantially rigidly interlocked, but are simply held in lubricant communicating contact by manual effort exerted to press the nozzle against the nipple.

My present invention, I believe, has a more general and useful application to lubricating apparatus of the so-called contact type, and is largely directed to the provision of improved lubricating apparatus of the contact type.

Reference may advantageously be had to my copending application, Serial No. 401,276 filed October 21, 1929 wherein are related the problems attending the manufacture, maintenance, and use of lubricating apparatus of the contact type, previously employed, and the difficulties in achieving satisfactory results in the practical use of such apparatus, and for a disclosure of certain improvements in lubricating apparatus, related to the improvements of my present invention.

In my said copending application, a nozzle and nipple construction is disclosed wherein a posteriorly disposed portion of a tubular inlet for the nipple is engaged by a tubular end of the nozzle telescoped over the nipple and guided thereby, to establish a lubricant sealing contact between the nozzle and nipple, and wherein reliance is had upon engagement of spaced coaxial surfaces of the nozzle and nipple to arrest movements of the nozzle as would produce improper angular divergence between the nozzle and the nipple, as in prior constructions, and effect loss of lubricant between the nozzle and nipple surfaces; my present invention relates to improved apparatus for performing a corresponding function.

As in my said copending application, also, the apparatus of my present invention involves the provision of means additional to the contacting portions of the nozzle and nipple, for providing that additional degree of angularity of the lubricant gun relative to the nipple which is sometimes desirable in the lubrication of nipples disposed in relatively inaccessible positions on a mechanism.

An object of my invention is to provide an improved manually maintainable nozzle and nipple coupler mechanism for the contact type.

Another object of my invention is to provide coupler mechanism of the general type disclosed in my said copending application, but wherein greater variance in axial angularity between the nozzle itself and the nipple associated therewith, may advantageously be effected.

Another object of my invention is to provide apparatus for a lubricating system susceptible of being manufactured in quantities, and which involves the combination of an improved nipple with the dispensing nozzle of a lubricating mechanism according to a new method whereby objectional and improper operation is avoided.

Another object of my invention is to provide improved lubricating apparatus including a nozzle and nipple of the contact type so constructed as to make it unnecessary to provide either of the contact surfaces of the nozzle and nipple of substantially partispherical form, which is so difficult to attain with sufficient preciseness in the practical manufacture of the devices in quantities, and which is difficult to maintain in the use of the apparatus.

Another object of my invention is to provide an improved nozzle and nipple construction for lubricating apparatus of the contact type wherein improper excessive angular movements of the nozzle relative to the nipple will be arrested by interengaging nonsealing portions of the nozzle and nipple surfaces.

Other objects of my invention and the invention itself will be apparent to those skilled in the art to which my invention appertains from the following description of certain embodiments of my invention, and in which reference is had to the accompanying drawing illustrating the said embodiments.

Figure 1:
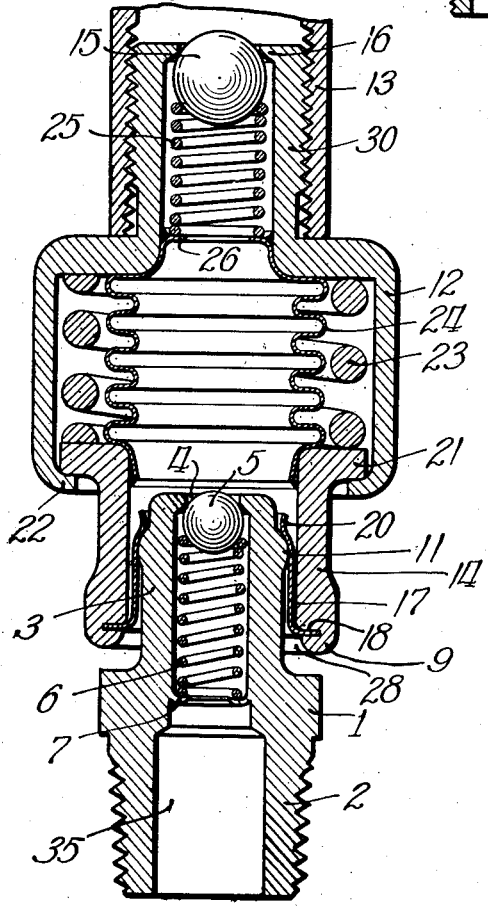
Fig. 1 is a longitudinal medial sectional view of a nozzle support, a lubricant dispensing nozzle and a nipple shown in lubricant receiving relation thereto, embodying my invention.
Figure 2:
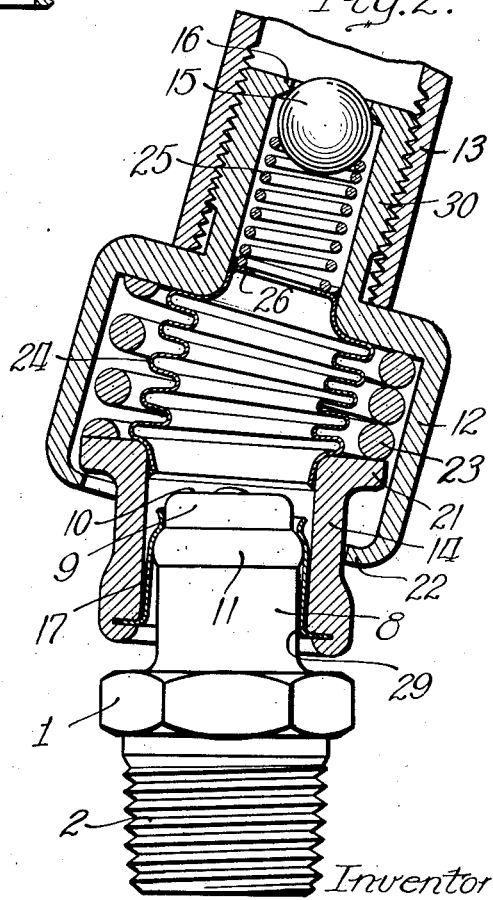
Fig. 2 is a like view of the apparatus of Fig. 1, shown, however, with the nozzle and support disposed relatively angularly to each other and to the nipple.

Referring now, first, to the embodiment of my invention illustrated in Figs. 1 and 2, the nipple thereof preferably has an intermediate enlarged waist 1 having a hexagonal outer surface for turning the nipple by its threaded stem 2 into a recess of an element of bearing to be lubricated. The stem 2 extends longitudinally from the waist in one direction and, together with the tubular lubricant receiving shaft 3, extending longitudinally from the waist in the other direction, and with said waist, provides a stepped lubricant passage from the inlet opening 4 at the end of the shaft 3 to the open end 5 of the stem 2. As shown, the shaft, waist and stem are integrally joined.

A valve ball 5 normally effects a closure of the opening 4 by engaging the inner edge of an inturned flange at the tip end of the tubular walls of the shaft 3, and is pressed to its seat by a spring 6 interposed between said ball and an annular spring seat 7 projecting inwardly from the walls of the bore, at a portion longitudinally spaced from the ball 5 and, as shown, within the waist 1.

The outer surface of the shaft is formed with spaced portions 8 and 9, each of substantial length and extending, respectively, from the waist 1 and the end 10 of the shaft by substantially cylindrical portions which are separated by the intermediate ferrule 11. The ferrule 11 is annular and convexly rounded longitudinally, and, therefore, projects laterally from the substantially cylindrical surfaces 8 and 9.

At 13 an end fragment of the tubular end of a lubricant dispensing mechanism, such as a grease gun, or other lubricant compressor, or conduit leading therefrom and a nozzle supporting casing 12 attached thereto by a reduced tubular stem 30 which is screw threaded into the open end of said element 13, hereinafter assumed to be the dispensing end of a grease gun whose other parts may be of any suitable form, such as for instance like the grease gun shown in my copending application, S. N. 399,961 filed October 16, 1929.

The casing 12 houses a lubricant communicating universal joint mechanism whereby relative oscillation may occur between a tubular nozzle element 14 and the grease gun 13, together with the casing 12 supported thereon; the stem 30 contains a valve ball 15 spring pressed to a seat interiorly of the stem against the inwardly extending flange 16 of the stem walls at their end.

The nozzle element 14 is tubular in form and supports an interiorly reentrantly extending tube 17, by its outwardly extending end flange 18 which extends between jaws of the nozzle adjacent its end, which tightly clamp the flange 18 in a leakproof manner.

The clamping jaws are provided by reducing the thickness of the lateral walls of the nozzle 14 at their end by removing metal from their interior surface and inturning the reduced wall portion, which then appears as a jaw 19, to tightly press the flange 18 against the shoulder previously provided by the reduction in wall thickness.

The diameter of the tube 17 is preferably reduced at its free end 20 and the walls of the tube are preferably of inherently resilient material, and preferably metallic material. I find that spring brass, bronze alloys which may contain ten or fifteen per cent of aluminum, and steel may be advantageously employed for the composition of the tubular element 17.

The tubular nozzle 14 is provided with a terminal flange 21 extending outwardly from its other end within the casing 12, and is retained therein by an inturned flange 22 of the casing walls. The annular flange 22 may be properly regarded as an apertured end wall of the casing 12, through the aperture of which the tubular end of the nozzle element 14 is projected, said nozzle element being retained within the casing by engagement with the inner surface of the apertured end wall.

Coaxial with the lateral walls of the casing 12, and disposed in successive telescoped relation therein, are provided a helical spring 23 and a tubular bellows 24 of, preferably, thin metallic material, and having lateral walls comprising a plurality of longitudinally extending, preferably sinuosoidal folds between its ends which are secured to the flanged end 21 of the nozzle element 14, and the opposing end wall of the casing 12, respectively.

The bellows 24 is regularly manufactured in quantities at low cost, particularly for the making of thermostats, but in my present invention I employ it for the purpose of providing a tubular conduit susceptible to relative distortional movements of its end portions, whereby it is adapted to form the lubricant conducting element of a lubricant conducting universal joint mechanism comprising the flanged nozzle element, the casing and the spring 23.

The ends of the bellows element may be soldered or otherwise secured to the engaged parts of the casing and nozzle element, or reliance, in some cases, may be had upon the effects of fluid pressure within the bore of the bellows, causing it to effect longitudinal pressure by its ends against said engaged parts, and thereby make a fluid pressure maintained contact therewith; however, for most purposes I prefer that the annular ends of the bellows element be securely soldered thereto.

The valve ball 15 is normally spring pressed to its seat, as before stated, by a helical spring 25 interposed between the ball and an inturned flange 26 of the end of the bellows providing a spring supporting seat.

The apparatus of my present invention, according to the embodiment of Figs. 1 and 2, is very easily operated to effect communication of lubricant under varying conditions of practice between the end 13 of a lubricant compressor, or the like. Fig. 1 shows the dispensing end of the gun 13 projected axially towards a lubricating nipple with the nozzle element 14 telescoped over the free end of the nipple shaft 3.

The reentrant, resilient tubular element 17 under such a condition engages with the longitudinally rounded outer surface of the annular contact element 11, herein shown as an integral ferrule of the nipple shaft, disposed intermediate its ends and spaced, preferably, as shown, from the apertured end thereof and from its base.

The diammetrical dimensions of the tube 17, the ferrule 11, and the longitudinally disposed portions 8 and 9 of the shaft, which are inwardly spaced from the inner surfaces of the tube 17, are preferably such, as shown, that the annular walls of the tube 17 are required to be stretched, against the inherent resiliency of the material composing them, in order to permit the telescoping movement of the ferrule 11 from the nozzle mouth opening 28, inwardly longitudinally of the nozzle until the relative positions of the nozzle and nipple, as shown in Fig. 1, are achieved.

This operation involves putting under tensile stress, the portions of the tube 17 which are adjacent the annular portion of the tube 17 engaged by the ferrule 11, elongating the metallic elements of such adjacent portions, which may be herein regarded as fibres, that their diameters are reduced. This effects a close embracing contact between the engaged portion of the tube 17 and the ferrule 11, over a surface of the ferrule, extending longitudinally of the shaft 3 for a considerable length, and throughout which length the tube 17 is resiliently distorted to embrace said ferrule.

A good lubricant-proof contact may, therefore, be had between the engaged surfaces of the ferrule and the resilient tube; when, however, lubricant under pressure projected through the element 13, casing stem 30, tubular bellows 24, nozzle element 14, exerts pressure upon the outer surfaces of the resilient tube 17, such fluid pressure will intensify the pressure of contact previously existing between the surface of the ferrule 11 and the resiliently expanded tube portion. Therefore, such a lubricant seal is accomplished between the nozzle tube 17 and the ferrule as will effectively prevent loss of lubricant between the engaged surfaces thereof.

Fig. 2 illustrates a condition commonly had in practical use of the apparatus of the embodiment of my invention illustrated in Fig. 1, wherein the compressor element 13 extended toward the nipple is disposed with its axis at a considerable angle to the axis of the nipple and wherein the lubricant communicating universal joint mechanism comprising the casing 12, tubular bellows 24, spring 23 and flanged nozzle element 14 is operative to effect relative axial angularity between the positions of the compressor portion 13 and the nozzle element 14. Fig. 2 shows, also, the nozzle element 14 disposed out of axial alignment with the nipple shaft 8 over which it is telescoped while maintaining lubricant sealing contact by the circumferentially stretched walls of the tube 17 with the outer longitudinally rounded surface of the ferrule 11.

The inner surfaces of the tubular nozzle element 14 are laterally spaced from the lateral surfaces 8 and 9 of the nipple shaft, and, therefore, engagement of the nozzle element 14 with said shaft is normally avoided; however, engagement as at 29 between the shaft surface 8 and the interior surface of the tube 17 adjacent its point of support at the end of the nozzle element 14 prevents an undue degree of angularity between the nozzle 14 and the nipple.

Upon an attempt to tilt the nozzle element 14 to a greater relative angular position, by an oscillatory movement of the compressor element 13, such engagement as at 29, preventing further tilting of the nozzle element per se, effects such inward movement of the flanged end of the nozzle element at one side, within the casing 12, as will compress the helical spring 23 at such side to bring its convolutions thereat, closely together while the parts at the other side of the casing are in relatively distended relation, as shown.

The folded bellows walls upon such a condition will be longitudinally compressed, also at such side of the casing and remain distended, as shown at the said other side of the casing.

Therefore, by the operation of the apparatus, as above described, and including the nipple shaft having an intermediately disposed ferrule, making resiliently effected distending engagement with an interior surface of the resilient tube 17, and the spaced rigid nozzle element, which is oscillative relative to said shaft to a degree determined by the engagement at 29 between a nipple shaft surface disposed remotely to the ferrule and a nozzle part, and the universal joint mechanism contained in the casing 12, a considerable degree of angularity may be achieved during lubricating periods.

The reduction in diameter of the portion 20 of the resilient tube and the further reduction consequent to the distension of the engaged intermediate portion of the tube by the nipple shaft ferrule, prevents the nozzle from being projected over the nipple shaft beyond the operative positions of the tube 17, substantially as shown.

Figure 3:
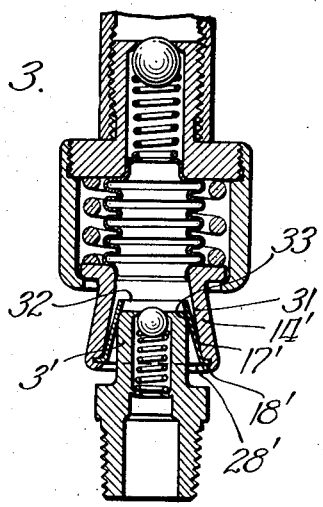
Fig. 3 is a like view of another embodiment of my invention.

In Fig. 3 another embodiment of my invention is shown wherein the nozzle element 14' has a frustro-conical inner surface 31 within which the reentrantly extending resilient tube 17' is disposed, held by an end flange 18'.

The embodiment of Fig. 3, however, employs the resilient contactor tube with progressively converging lateral walls which terminate at 32 in an open end whose diameter is considerably reduced relative to the end adjacent the nozzle mouth opening 28'.

Although the converging resilient walls 17' are illustrated as being of substantially frustro-conical form, they may vary therefrom, as by making them longitudinally curvilinear.

By the use of a tube having resilient lateral walls of substantially the form shown in Fig. 3, engagement may be had by an end edge annular surface 33 of a nipple otherwise like that as illustrated in the foregoing figures, except that the ferrule 11 may be, as herein, omitted. Engagement of the inner surfaces of the tube 17' with the end edge surface of the nipple shaft 3', effected by telescoping the flared mouth of the nozzle, provided by the tube 17' onto the nipple shaft until its annular end edge portion engages the inner surfaces of the tube 17' which normally are of lesser diameter than said edge portion of the shaft.

The apparatus of Fig. 3 operates similarly to that of the foregoing figures with respect to the mode of distending to substantially annular form, resilient walls of the tube 17' which incidentally take the form of the distending end edge surface, with which the distended walls make contact, and the distension of the walls by the nipple, is, in both cases, manually maintainable by a longitudinally directed thrust effort exerted upon the compressor element 13 towards the nipple, and generally, longitudinally thereof, although relative angularity between limits may be had.

Having thus described my invention in certain embodiments, I am aware that numerous and extensive departures may be made from the said embodiments, but without departing from the spirit of my invention.

I claim:

1. In lubricating apparatus, in combination with a nozzle, a nipple, said nozzle comprising a thin walled inherently resilient tube, said nipple comprising a lubricant receiving tubular shaft, said shaft having an annular projection disposed intermediate its ends, said tube being telescopically engageable with said shaft to effect circumferential distension of an intermediate portion of the tube by the intermediately disposed annular shaft projection.

2. In lubricating apparatus, in combination with a nozzle, a nipple, said nozzle comprising an inherently resilient tube having thin walls of metallic material, said nipple comprising a lubricant receiving tubular shaft, said tube telescoping said shaft and engaging an approximately annular portion thereof with an intermediate portion of the tube, to effect circumferential distension of said intermediate portion.

3. In lubricating apparatus, a substantially rigid tubular nozzle holder, a sealing tube comprising thin walls of metallic material secured by an end to an end portion of the holder and extending reentrantly in spaced relation within the walls of the holder, and adapted to be resiliently distended in an intermediate portion by an engaged annular portion of a nipple over which the tube is projected.

4. In lubricating apparatus, a tubular nozzle having a reentrant interiorly disposed resilient tube and an outer tubular element supporting said tube by an end, said tube adapted to be telescoped over a nipple inlet tube, having a laterally disposed annular shoulder, and adapted to be resiliently distended in an intermediate portion engaged by said shoulder.

5. In lubricating apparatus, an open-mouthed tubular nozzle adapted to be telescoped over a nipple inlet tube, said nozzle comprising a pair of coaxial spaced tubes joined at the mouth of the nozzle, said inner tube being of thin inherently resilient material, and circumferentially distensible intermediate its ends by engagement of a circumferential element of said inlet tube pressed therein.

6. In a lubricating coupler, a tubular nozzle, and a nipple inlet tube having an outwardly projecting ferrule substantially spaced from its ends, and engageable with an interior surface of said nozzle remote from the discharge end thereof.

7. In a lubricating coupler, a tubular nozzle and a nipple inlet tube, said nozzle comprising a thin resilient metallic tube telescopable over the inlet tube, said inlet tube having a relatively narrow outwardly extending projection of longitudinally rounded form making distending engagement with an inner surface of the nozzle tube remote from the discharge end thereof.

8. In lubricating apparatus, a tubular nozzle comprising a pair of relatively telescoped tubes joined together at their lubricant dispensing ends, the inner of said tubes being of relatively thin inherently resilient sheet metal, engageable by an inner surface, with an annular nipple inlet tube portion of larger diameter, to distend the engaged portion of said inner tube when the nozzle is longitudinally projected over said inlet tube portion.

9. In a lubricating coupler, a tubular nozzle comprising a substantially thin walled inherently resilient tubular contactor terminating at an end in an outwardly extending flange, a tubular holder telescoped over and supporting said contactor by its flange, said contactor adapted to receive a nipple inlet tube telescoped therein, said inlet tube engageable with an intermediate portion of the interior walls of the contactor to distend them within the elastic limit of the material thereof.

10. In a lubricating coupler, a tubular nozzle comprising a substantially thin walled inherently resilient tubular contactor terminating at an end in an outwardly extending flange, a tubular holder telescoped over and supporting said contactor by its flange, said contactor adapted to receive a nipple inlet tube telescoped therein, said inlet tube engageable with an intermediate portion of the interior walls of the contactor to distend them within the elastic limit of the material thereof, and engageable by a longitudinally spaced portion with an end portion of said walls to arrest angular movements of the nozzle relative to the nipple.

11. In lubricating apparatus, a nozzle comprising a substantially rigid tubular nozzle holder and a sealing tube having thin walls of metallic material secured by an end to an end portion of the holder and extending reentrantly in spaced relation within the walls of the holder, and adapted to be resiliently distended in an intermediate portion by an engaged annular portion of a nipple over which the tube is projected, said nozzle engageable by a portion substantially longitudinally spaced from said sealing tube intermediate portion, by a lateral surface of the nipple, longitudinally spaced from its said engaged annular portion.

12. In a lubricating coupler, a nozzle comprising a relatively thin inherently resilient tubular wall, a nipple inlet tube, having a laterally disposed annular shoulder of a diameter greater than an intermediate constricted portion of said tubular wall, interiorly engagable with said tubular wall by a thrust effort of the nozzle onto said tube to distend circumferentially said intermediate constricted portion of said tubular wall.

13. In lubricating apparatus the combination of a nozzle comprising a tubulature having a relatively thin inherently resilient sleeve reentrantly secured thereto, said sleeve being provided with a neck portion remote from the discharge end thereof, and a nipple comprising a tubular shaft, telescopically engageable by said sleeve, having an annular projection intermediate the ends of said shaft engageable with said neck portion to distend the same within the elastic limit of the material thereof.

In testimony whereof I hereunto affix my signature this 19 day of October, 1929.

OSCAR U. ZERK.